Aug. 17, 1954 W. P. HILL 2,686,504
FILTER FOR ENGINE CRANKCASES
Filed Jan. 24, 1951 2 Sheets-Sheet 1

INVENTOR.
Walter P. Hill.
BY
Harness, Dickey & Pierce
ATTORNEYS.

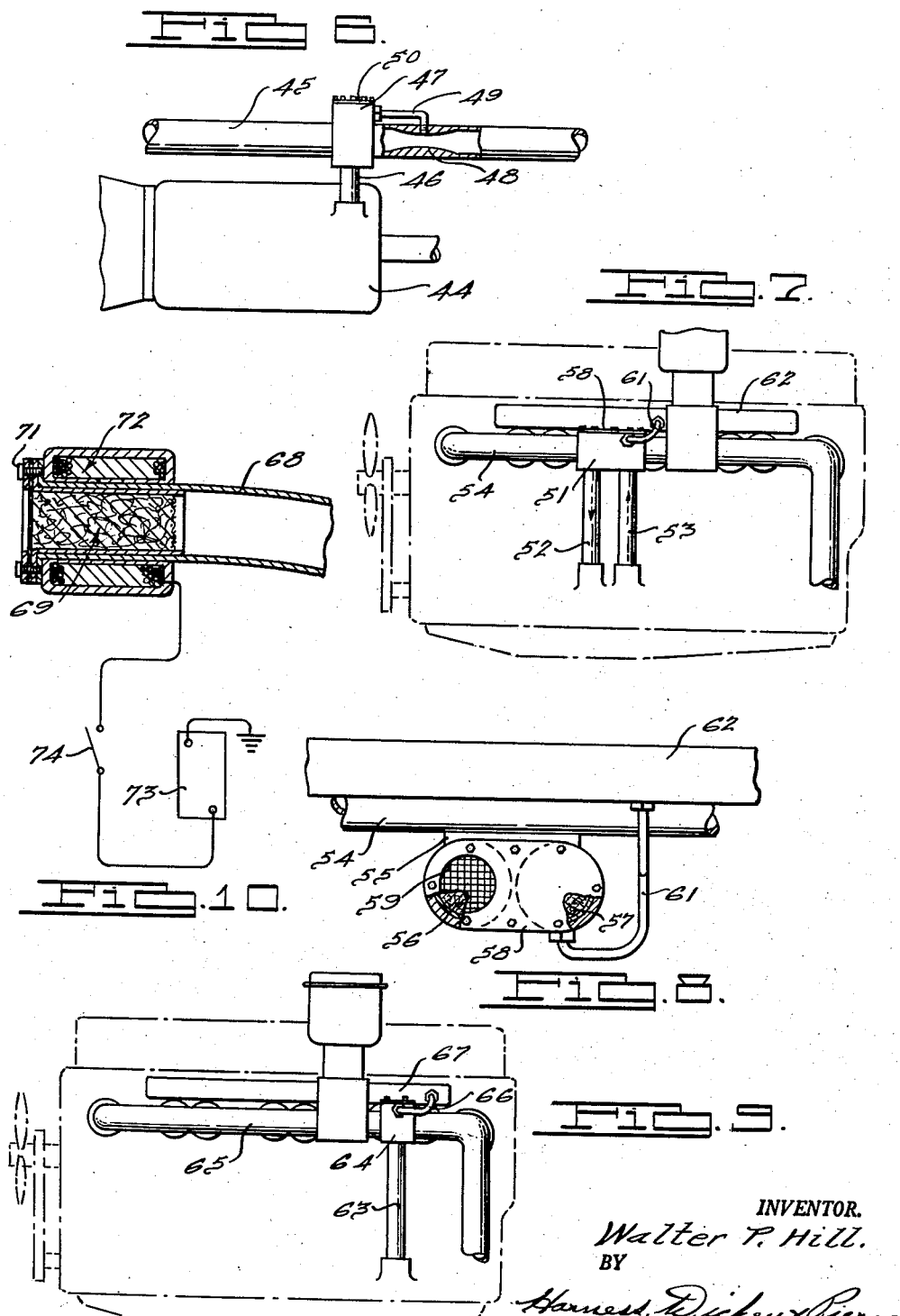

Patented Aug. 17, 1954

2,686,504

UNITED STATES PATENT OFFICE 2,686,504

FILTER FOR ENGINE CRANKCASES

Walter Pearl Hill, Pontiac, Mich.

Application January 24, 1951, Serial No. 207,508

19 Claims. (Cl. 123—41.86)

This invention relates to vehicles having internal-combustion engines and more particularly to attachments for the crankcases of such engines or to the vehicle transmissions for increasing their efficiency of operation. This application is a continuation-in-part of my application Serial No. 140,209, filed January 24, 1950 (now abandoned).

It is an object of the present invention to provide a device for insuring the elimination of moisture from the air and gases circulating within the crankcase of an automotive internal-combustion engine or the transmission of the vehicle, so as to prevent the contamination of the oil within these units and the formation of sludge and other undesirable deposits. More particularly, it is an object to provide an improved air filter system which will extract moisture from air entering and leaving the unit and will increase the circulation of the air through the moisture-extracting means, thereby increasing their efficiency of operation.

It is another object to provide an improved air filter system having the above-described characteristics, and in which means are provided for continually reactivating the moisture absorbing elements of the system. In particular, it is an object to provide an air filter system having one or more units which incorporate a drying agent or desiccant within a housing or cartridge, the housing being mounted adjacent a source of heat on the engine so that the heat may continually reactivate the desiccant.

It is also an object, in one form of my invention, to provide an improved air filter of the above character, in which the intake manifold of the engine is utilized to increase the circulation of air through the crankcase and through the moisture-absorbing media.

It is a further object, in another form of my invention, to provide an air filter system as described above, in which the exhaust manifold of the engine is utilized both to reactivate the desiccant in the air drying unit and also to increase the flow of air through said unit.

It is also an object of my invention, in still another form thereof, to provide a dual air filter unit having a portion for drying the air entering the crankcase and another portion for desiccating the air leaving the crankcase, both portions being reactivatable by a heat source on the engine.

It is a further object of my invention, in another modification thereof, to provide an air filter system for a crankcase which has no direct inlet connection from the atmosphere, but rather is connected to a source of vacuum such as the intake manifold for continually withdrawing and desiccating the air from the crankcase.

Other objects, features, and advantages of the present invention will become apparent from the subsequent description taken in conjunction with the accompanying drawings.

In the drawings:

Fig. 6 is a side elevational view of a transmission housing having air filter cartridge connected thereto and operated by an exhaust line.

Fig. 7 is a side elevational view similar to Fig. 1 but showing another modification having a dual inlet and withdrawal cartridge unit.

Fig. 8 is a plan view of the modification of Fig. 7 and showing the arrangement of the cartridges and the intake manifold connection.

Fig. 9 is a side elevational view similar to Fig. 1 but showing a further modification of the crankcase system having no direct inlet connection to the atmosphere; and Fig. 10 is a schematic view showing another method of reactivating the silica gel cartridge.

The air filter system of my invention is adapted for use in connection with internal-combustion engine crankcase, transmission units, or any other application wherein a body of oil or other such lubricant is held within an enclosed housing having moving parts lubricated by the oil. In such installations the expansion and contraction of the volume of the air and gases above the body of oil results in the collection of moisture within the housing. The principles of this invention involve the use of a cartridge or other unit having a drying agent such as silica gel, the cartridge being disposed at the point of influx of the air into the housing, and being operatively connected to a source of heat which serves to continually reactivate the desiccating medium. An additional or alternative vent connection from the crankcase or transmission serves to withdraw air from the unit when the engine is in operation and also serves to vent the unit when the engine is not in use. This additional connection is also preferably provided with an air filter cartridge similar to the first-mentioned cartridge which serves to desiccate the air drawn from the housing and to desiccate air entering the housing through the additional connection when the air within the housing contracts upon cooling.

Figure 1:
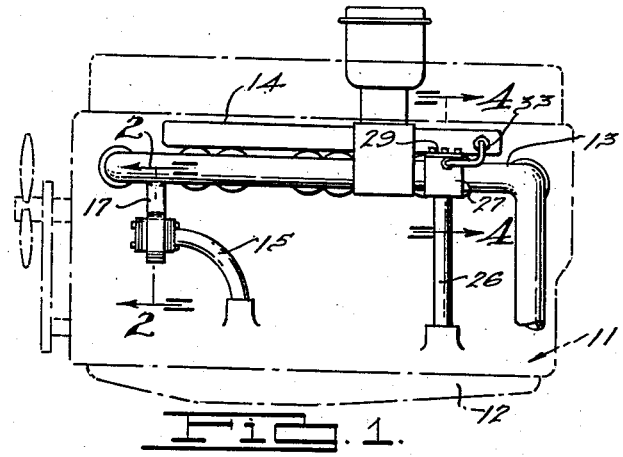
Fig. 1 is a side elevational view of a preferred form of my air filter system installed in a conventional internal-combustion engine.
Figure 2:
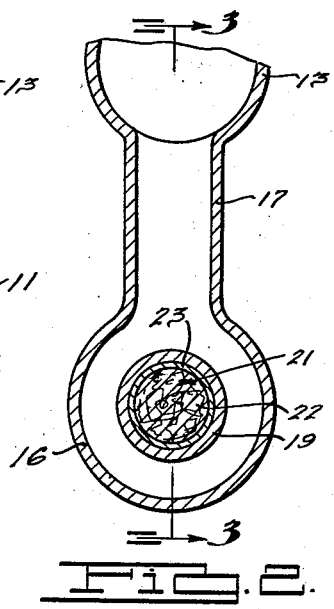
Fig. 2 is an elevational view in cross-section taken along the line 2—2 of Fig. 1 and showing the heater connection for reactivating the air intake filter cartridge.
Figure 3:
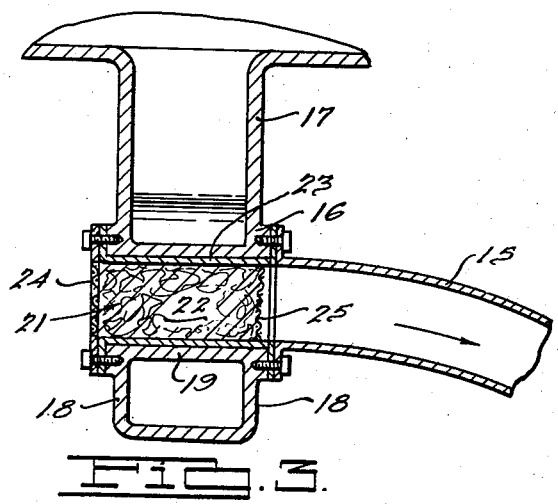
Fig. 3 is a cross-sectional view taken along the line 3—3 of Fig. 2 and showing the construction of the cartridge.

As shown in Fig. 1, the invention is illustrated as mounted on an internal-combustion engine 11 having the conventional crankcase 12 at its lower end. The engine is provided with an exhaust manifold 13 and an intake manifold 14, both of a conventional nature, and the crankcase is provided with an inlet vent 15 for allowing air to flow into the crankcase. The upper end of vent 15 is secured to an annular chamber 16 which is connected by a conduit 17 to the exhaust manifold 13. The end walls 18 of chamber 16 are connected by inner cylindrical cartridge housing 19, and an air filter cartridge 21 is held within the cartridge housing. Cartridge 21 preferably comprises a drying agent or desiccant 22 of a solid type having good non-deliquescent characteristics, such as silica gel. However, it is possible to use practically any moisture absorbing filter material which is capable of being reactivated when heated to temperatures within the range of the exhaust gases of an internal-combustion engine. The silica gel is held within a tubular cartridge container 23 and the cartridge is preferably held within the housing 19 by means of screened or foraminated end closures 24 and 25.

Upon operation of the engine 11 or upon contraction or expansion of air within the crankcase 12, air will be forced through the desiccant material 22 and will thus be dried out, thereby insuring a minimum of moisture within the crankcase. Upon operation of the engine, the heat of the exhaust gases flowing through conduit 17 to chamber 16 will reactivate the silica gel so that the latter may be used indefinitely in the installation.

Figure 4:
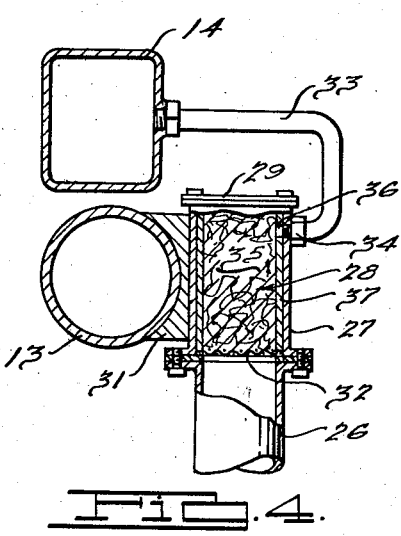
Fig. 4 is a cross-sectional view taken along the line 4—4 of Fig. 1 and showing the air withdrawal cartridge unit together with its connection to the intake manifold.

The present application provides in addition to the above structure a second vent 26 for the crankcase 12, it being understood that the engine may be operated either with or without this additional vent. Vent 26 is preferably spaced longitudinally from vent 15 and has mounted at the upper end thereof a cartridge housing 27 within which is disposed an air desiccant filter cartridge 28 similar to the cartridge 21. As best seen in Fig. 4, a cover plate 29 is secured on the upper end of cartridge housing 27, so that air is not allowed to flow through the upper end of the cartridge. Housing 27 is preferably secured to the side of exhaust manifold 13 by means such as an adapter block 31, so that the housing 27 and therefore the cartridge 21, is continually heated during the operation of the engine. A screened or foraminated closure 32 at the lower end of housing 27 retains the cartridge 28 in operative position while allowing the air to flow upwardly thereto. Adjacent the upper end of the housing 27 is connected a tube 33 which leads to intake manifold 14. The connection 34 of line 33 to the housing is such that a continuous air path is provided between the material 35 within the cartridge and the intake manifold. For this purpose, an aperture 36 may be provided in the shell 37 of the cartridge 28, this aperture being aligned with the connection 34 when the cartridge is in operative position.

When the engine is in operation, the intake manifold 14 will normally contain air or gases at below atmospheric pressure whereas the air pressure within the crankcase 12 will normally be at or slightly above atmospheric. This pressure differential will cause air to flow upwardly from the crankcase through vent 26, through cartridge 28 and into tube 33 and the intake manifold 14. This action will tend to evacuate the air within crankcase 12, thus causing an increased flow of air into the crankcase through vent 15. At the same time, the air flowing through cartridge 28 will be desiccated, and this will prevent moisture from entering the intake manifold as well as from reentering the crankcase should the air momentarily reverse its flow. Simultaneously with this action, the heat flowing from exhaust manifold 13 through adapter block 31 to the housing 27 will reactivate the silica gel or other desiccant 35, thus permitting the indefinite use of the cartridge. When the engine is stopped, the contraction of air within crankcase 12 due to cooling will draw air from the atmosphere through both cartridges 21 and 28, the air from cartridge 28 being received through the intake manifold. The presence of both of these cartridges will therefore prevent the accumulation of moisture in the crankcase due to this influx of air. The vent 26 in combination with the cartridge 28 thus serves the dual function of increasing the circulation of air in the crankcase when the engine is operating, and insuring the elimination of moisture from the air entering the crankcase upon cooling. Tests of vehicles having the installation of my invention have not only shown a lessened amount of oil contamination, but have also resulted in a marked decrease in crankcase oil consumption.

Figure 5:
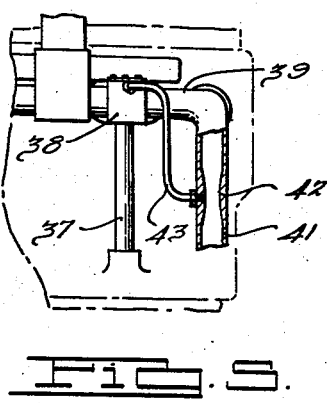
Fig. 5 is a fragmentary side elevational view similar to Fig. 1 but showing a modified arrangement wherein the withdrawal cartridge is connected to the exhaust manifold.

Fig. 5 illustrates a modified form of my invention in which the suction is created by a connection to the exhaust pipe rather than from the connection to the intake manifold. In this modification, the vent 37 corresponds to the vent 26 of the previous embodiment. The cartridge housing 38 is mounted on the exhaust manifold 39 which has leading therefrom the exhaust riser 41. A Venturi restriction 42 is built into or inserted within the exhaust riser, and a tube 43 is connected between the venturi and the upper end of the cartridge housing. Due to the lower pressure caused by the flow of gases through the Venturi restriction, suction will be created within tube 43 which will cause the withdrawal of air from the crankcase upwardly through vent 37 during engine operation. When the engine is stopped, contraction of the crankcase air will allow air to be drawn in from the exhaust riser through the cartridge within the housing 38. It will be understood that the position of venturi 42 is not critical, but that this element may be disposed in other portions of the exhaust system having a substantial flow of gases in one direction.

Fig. 6 illustrates a second modification of my invention showing the adaptation of its principles to the venting of a transmission housing 44. Although the illustrated embodiment shows a housing such as is found in an automotive vehicle which is adjacent an exhaust line 45, it will be understood that the principles of the invention are equally applicable to other types of housings. In the present instance a vent 46 is provided on housing 44, the upper end of the vent having a cartridge housing 47 within which is disposed a desiccant filter cartridge such as that described above, and which is mounted on the exhaust line 45 so as to receive heat therefrom. A Venturi restriction 48 is built into or inserted within the exhaust line 45 of the vehicle and a tube 49 connects the cartridge housing to the Venturi restriction. The flow of exhaust gases through line 45 during operation of the engine will therefore cause suction within tube 49 and air will thus be drawn upwardly through vent 46, cover plate 50 insuring the proper flow of air. At the same time, this air may be replaced within the transmission housing by such means as leakage past the bearings (not designated) at the ends of the housing. The heat from the exhaust line will serve to continually reactivate the desiccant within the cartridge. When the engine is stopped, the connection of vent 46 to the exhaust line 45 will allow normal breathing of the transmission housing air, the cartridge within housing 47 insuring the elimination of moisture from air entering the housing. It will be understood that although no intake vent is shown in this embodiment, such a vent could be provided if desired, together with its own desiccating filter cartridge.

Figs. 7 and 8 illustrate a fourth embodiment of my invention having a dual cartridge unit 51 which replaces the two cartridges 21 and 28 of the modification of Figs. 1-4. This unit surmounts an inlet vent pipe 52 and a withdrawal vent pipe 53 which are preferably in adjacent parallel relation. As in the first embodiment, the dual unit 51 is mounted on the exhaust manifold 54 by means of an adapter block 55, and the two cartridges 56 and 57 within the unit will thus be reactivated by heat from the exhaust manifold in the manner previously described. As is best seen in Fig. 8, a cover 58 is mounted on top of the housing 51 and holds the two cartridges in place. Cover 58 is provided with a screened circular opening 59 above the cartridge 56, thus allowing air to flow downwardly through vent 52. The cover portion above cartridge 57 is solid and the air can thus flow to or from this cartridge only through tube 61 which is connected to intake manifold 62. The operation of this unit will be similar to that described with relation to the embodiment of Figs. 1-4. It will be observed that the provision of this dual unit will permit the quick replacement of both cartridges simultaneously, and will also permit a considerable saving of space in the engine installation.

Fig. 9 illustrates a fifth modification of the invention which is generally similar to the embodiment of Figs. 1-4 but which entirely eliminates the inlet vent 15 together with its associated cartridge. In this embodiment only one vent 63 is provided having at its upper end a cartridge container 64 which is mounted on the exhaust manifold 65. Tube 66 leads from container 64 to the intake manifold 67, thus permitting the intake manifold to draw air upwardly through vent 63 during operation of the engine. This will insure a constant circulation of air and gases within the crankcase, additional air and gases being drawn into the crankcase through other incidental openings and possibly by blowby past the pistons. When the engine is stopped, the crankcase air contraction will cause intake flow through the vent 63, this air being drawn from the intake manifold through the cartridge within housing 64 and thus being desiccated.

Fig. 10 illustrates another method of reactivating either or both of the silica gel cartridges, this method being independent of the heat from the exhaust gases. As illustrated, the heating means is shown as mounted adjacent a cartridge such as the cartridge 21 of the embodiment of Figs. 1-4, although it will be understood that the construction could as well be applied to the other modifications. The vent 68 has telescoped within its upper end the filter cartridge 69, the cartridge being removably secured in place by bolts 71. The heating element 72 is diagrammatically shown in the form of a resistance supported on the upper end of vent 68 and encircling the cartridge 69. The heating element may be connected to the vehicle battery 73 by means of a switch 74 controlled by the ignition key. The arrangement is therefore such that when the engine is in operation, the heating element 72 is energized to elevate the temperature of the desiccant within cartridge 69 to thereby reactivate the same.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

In the claims:

1. In combination with an internal combustion engine having a crankcase, a vent connected to said crankcase, a filter for said vent comprising a desiccant of the type which is reactivatable in the presence of heat, means for heating the desiccant to reactivate the same, and a source of intermittent vacuum connected to said filter whereby air flow will be induced from said vent through said desiccant when vacuum is developed, and air drawn into the crankcase through said vent during periods of no vacuum will pass through said desiccant.

2. In combination with an internal combustion engine having a crankcase, a vent connected to said crankcase, a filter for said vent comprising a desiccant of the type which is reactivatable in the presence of heat, a connection between said filter and a source of heat in said internal combustion engine for heating the desiccant to reactivate the same, and a source of intermittent vacuum connected to said filter whereby air flow will be induced from said vent through said desiccant when vacuum is developed, and air drawn into the crankcase through said vent during periods of no vacuum will pass through said desiccant.

3. In combination with an internal combustion engine having a crankcase, a vent connected to said crankcase, a filter for said vent comprising a desiccant of the type which is reactivatable in the presence of heat, means for heating the desiccant to reactivate the same, and a source of intermittent vacuum in said internal combustion engine connected to said filter whereby air flow will be induced from said vent through said desiccant when vacuum is developed, and air drawn into the crankcase through said vent during periods of no vacuum will pass through said desiccant.

4. In combination with a housing adapted to contain a lubricant, a vent connected to said housing, a filter for said vent and containing a non-deliquescent material capable of being reactivated by heat, means for connecting said filter to a source of heat for reactivating said material, and means for connecting said filter to a source of intermittent vacuum, whereby air is withdrawn from said housing through said vent in said filter when vacuum is developed, and air drawn into said housing through said vent during periods of no vacuum passes through said filter.

5. In combination with a housing adapted to contain a lubricant, a vent connected to said housing, a conduit adjacent said housing and adapted to intermittently conduct gases at a relatively high temperature, a filter for said vent and containing a non-deliquescent material capable of being reactivated by heat, said filter being connected to said conduit so as to receive heat from said gases, a restriction in said conduit for creating an area of relatively low pressure, and a connection between said filter and said restriction, whereby air is withdrawn from said housing through said vent and said filter when gases are flowing through said conduit, and air drawn into said housing during periods of no gas flow passes through said filter.

6. In combination with an internal combustion engine having a crankcase, an intake manifold and an exhaust manifold, a vent connected to said crankcase, a filter for said vent comprising a desiccant of the type which is reactivatable in the presence of heat, said filter being mounted so as to receive heat from said exhaust manifold, and a connection from said filter to said intake manifold, whereby air is withdrawn from said vent through said filter when the engine is in operation, and air drawn into said crankcase through said vent when the engine is not in operation passes through said filter.

7. In combination with a housing adapted to contain a liquid, and having an air space above the liquid, a vent connected to said housing, a filter for said vent and containing a non-deliquescent material capable of being reactivated by heat, means for connecting said filter to a source of heat for reactivating said material, and means for connecting said filter to a source which varies in pressure above and below the air pressure in said housing, whereby air flowing in either direction through said vent will pass through said filter.

8. The combination according to claim 6, said crankcase being further provided with a second vent connected to the atmosphere, a filter in said second vent also comprising a desiccant which is reactivatable in the presence of heat, and a connection between said exhaust manifold and said last-mentioned filter, whereby the heat of gases within said exhaust manifold may reactivate said material.

9. In combination with an internal-combustion engine having a crankcase, an intake manifold, and an exhaust manifold, a pair of vents in adjacent relation for connecting said crankcase to the atmosphere, a dual filter unit operatively connected to said vents, said unit comprising two filters each having a desiccant which is reactivatable in the presence of heat, one of said filters being connected to each of said vents, and a heat-conducting connection between said exhaust manifold and said unit whereby said desiccants may be reactivated when the engine is in operation.

10. The combination according to claim 9, one of said filters being directly connected to the atmosphere, and a connection from said other filter to a source of vacuum in said internal-combustion engine, whereby air will be drawn through said last-mentioned filter from its corresponding vent.

11. In combination with an internal-combustion engine having a crankcasing adapted to contain a lubricant and having a vent connecting the crankcasing to the atmosphere, a filter for the vent comprising a desiccant of the type which is reactivatable in the presence of heat, and means for heating the desiccant to reactivate the same.

12. In combination with an internal-combustion engine having a crankcasing adapted to contain a lubricant and having a vent connecting the crankcasing to the atmosphere, a filter for the vent comprising a non-deliquescent material, and means for heating the material to reactivate the same.

13. In combination with an internal-combustion engine having a crankcasing adapted to contain a lubricant and having a vent connecting the crankcasing to the atmosphere, a filter for the vent comprising a drying agent of the type which is reactivatable in the presence of heat, and means responsive to the operation of the engine for heating the drying agent.

14. The combination set forth in claim 13 in which the drying agent is reactivated by the heat generated by the engine during operation.

15. The combination set forth in claim 13 in which the drying agent is incorporated in a cartridge removably supported on the engine in the path of flow of air into the vent.

16. In combination with an internal-combustion engine having a crankcasing adapted to contain a lubricant and having a vent connecting the crankcasing to the atmosphere, a filter for the vent comprising a removable cartridge containing a drying agent of the type which is reactivatable in the presence of heat, and means for heating the drying agent.

17. The combination set forth in claim 16 in which the cartridge is supported in heat conducting relation to a part of the engine.

18. In combination with an internal-combustion engine having a crankcasing adapted to contain a lubricant and having a vent connecting the crankcasing to the atmosphere, a filter for the vent comprising a desiccant of the type which is reactivatable in the presence of heat, and means for conducting the exhaust gases of the engine in heat transfer relation to the desiccant.

19. In combination with an internal-combustion engine having an exhaust manifold, a crankcasing adapted to contain a supply of lubricant and a vent for connecting the interior of the crankcasing to the atmosphere, a filter having a drying agent of the type capable of being reactivated in the presence of elevated temperatures, and means for supporting the drying agent in heat transfer relation to the exhaust manifold.

References Cited in the file of this patent

UNITED STATES PATENTS

| Number | Name | Date |
|---|---|---|
| 1,792,560 | Worbois | Feb. 17, 1931 |
| 2,079,100 | Begg | May 4, 1937 |
| 2,359,485 | Lowther | Oct. 3, 1944 |
| 2,396,601 | Palotsee | Mar. 12, 1946 |